(12) United States Patent
Muntz

(10) Patent No.: US 12,585,609 B2
(45) Date of Patent: Mar. 24, 2026

(54) AUTONOMOUS INTEGRATED TRANSLATOR FOR LOCAL BUS OPERATIONS

(71) Applicant: CORNELIS NETWORKS, INC., Wayne, PA (US)

(72) Inventor: Gary Muntz, Lexington, MA (US)

(73) Assignee: Cornelis Networks, Inc, Wayne, PA (US)

( * ) Notice: Subject to any disclaimer, the term of this patent is extended or adjusted under 35 U.S.C. 154(b) by 227 days.

(21) Appl. No.: 18/487,026

(22) Filed: Oct. 13, 2023

(65) Prior Publication Data

US 2025/0123985 A1 Apr. 17, 2025

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
CPC ..................... G06F 13/4221; G06F 2013/0026
See application file for complete search history.

(56) References Cited

U.S. PATENT DOCUMENTS

| | | | | |
|---|---|---|---|---|
| 10,904,277 | B1 * | 1/2021 | Sharifi Mehr | ...... H04L 63/1425 |
| 11,740,958 | B2 * | 8/2023 | Das Sharma | ........... G06F 11/10 |
| | | | | 714/776 |
| 12,189,944 | B1 * | 1/2025 | d'Abreu | ................ G06F 3/0607 |
| 12,332,826 | B2 * | 6/2025 | Das Sharma | ....... G06F 13/4295 |
| 12,360,934 | B2 * | 7/2025 | Das Sharma | ....... G06F 13/4273 |
| 2013/0215891 | A1 * | 8/2013 | Perreault | ................. H04L 45/52 |
| | | | | 370/390 |
| 2016/0371224 | A1 * | 12/2016 | Wanamaker | .......... G06F 13/362 |
| 2017/0004098 | A1 * | 1/2017 | Das Sharma | ....... G06F 12/1475 |
| 2018/0152317 | A1 * | 5/2018 | Chang | ................... G06F 15/161 |
| 2019/0045037 | A1 * | 2/2019 | Sukhomlinov | ....... G06F 9/5077 |

* cited by examiner

*Primary Examiner* — Henry Tsai
*Assistant Examiner* — Christopher A Daley
(74) *Attorney, Agent, or Firm* — H. Artoush Ohanian

(57) ABSTRACT

An autonomous and integrated translator for local server bus operations is provided. The translator comprises encapsulation logic and decapsulation logic. The encapsulation logic encapsulates transactions for local server bus operations with fabric-switched header and trailer information and the decapsulation logic decapsulates the header and trailer information.

10 Claims, 5 Drawing Sheets

AUTONOMOUS INTEGRATED TRANSLATOR FOR LOCAL BUS OPERATIONS

BACKGROUND

High-Performance Computing ('HPC') refers to the practice of aggregating computing in a way that delivers much higher computing power than traditional computers and servers. HPC, sometimes called supercomputing, is a way of processing huge volumes of data at very high speeds using multiple computers and storage devices linked by a cohesive high-bandwidth, low-latency fabric. HPC makes it possible to explore and find answers to some of the world's biggest problems in science, engineering, business, and others. Artificial Intelligence ('AI') is another field of technology embracing the use of high bandwidth, low-latency fabrics.

Current HPC and AI systems have many computing devices, switches, and resources. A conventional electrical interconnect for a server processor, for example, and that of a switch in a HPC or AI setting are different by design for disparate optimizations. Server processors on printed circuit boards are designed with server buses that support high lane counts such as PCIe, CXL, and others. By design, such high-lane count buses are optimized for wide channels and short cables. The electrical interconnects that make up a high-bandwidth, low latency fabric of HFAs and switches, however, are optimized for long cables and support low lane counts.

Flexible allocation of resources in an HPC setting, such as storage memory, among jobs enables cost-efficient delivery of the capabilities required by each of them—but only if they are co-located because conventional expansion bus standards are not optimized for longer cables. It would be advantageous to allow local bus operations, currently only available over local short channel, high lane count interconnects to be carried out with remote resources across the fabric.

BRIEF DESCRIPTION OF THE DRAWINGS

Many aspects of the present disclosure can be better understood with reference to the following drawings. The components in the drawings are not necessarily to scale, with emphasis instead being placed upon illustrating the principles of the disclosure. Moreover, in the drawings, like reference numerals designate corresponding parts throughout the several views.

DETAILED DESCRIPTION

Methods, systems, devices, and products for remote execution of local server bus operations according to embodiments of the present invention are described with reference to the attached drawings. "Local server bus operations," as that phrase is used in this disclosure refers to the communication and data transfer processes that occur between devices connected to the local server bus. Examples of local server buses standards include PCIe, CXL, and others as will occur to those of skill in the art. PCI Express (Peripheral Component Interconnect Express), officially abbreviated as PCIe or PCI-e, is a high-speed serial computer expansion bus standard. Compute Express Link ('CXL') is an open standard interconnect technology designed for high-speed communication between CPUs, GPUs, FPGAs, and other devices in data centers. These conventional expansion standards, such as PCIe and CXL are not optimized for longer cables and as such, PCIe and CXL local server bus operations are typically implemented locally, that is, with short cables.

An operation on a PCIe bus refers to the communication and data transfer processes that occur between devices connected to the bus. When a computer starts up or a PCIe device is connected, the system's BIOS/UEFI firmware initializes the PCIe bus and identifies connected devices through a process called enumeration. Each device is assigned a unique Bus, Device, and Function (BDF) number.

PCIe and CXL operations are transactional. PCIe or CXL transactions refer to the data transfers and communication that occur between devices using the PCIe or CXL protocol. These transactions encompass a wide range of operations, including memory read and write operations, configuration requests, and other data transfers.

Figure 1:
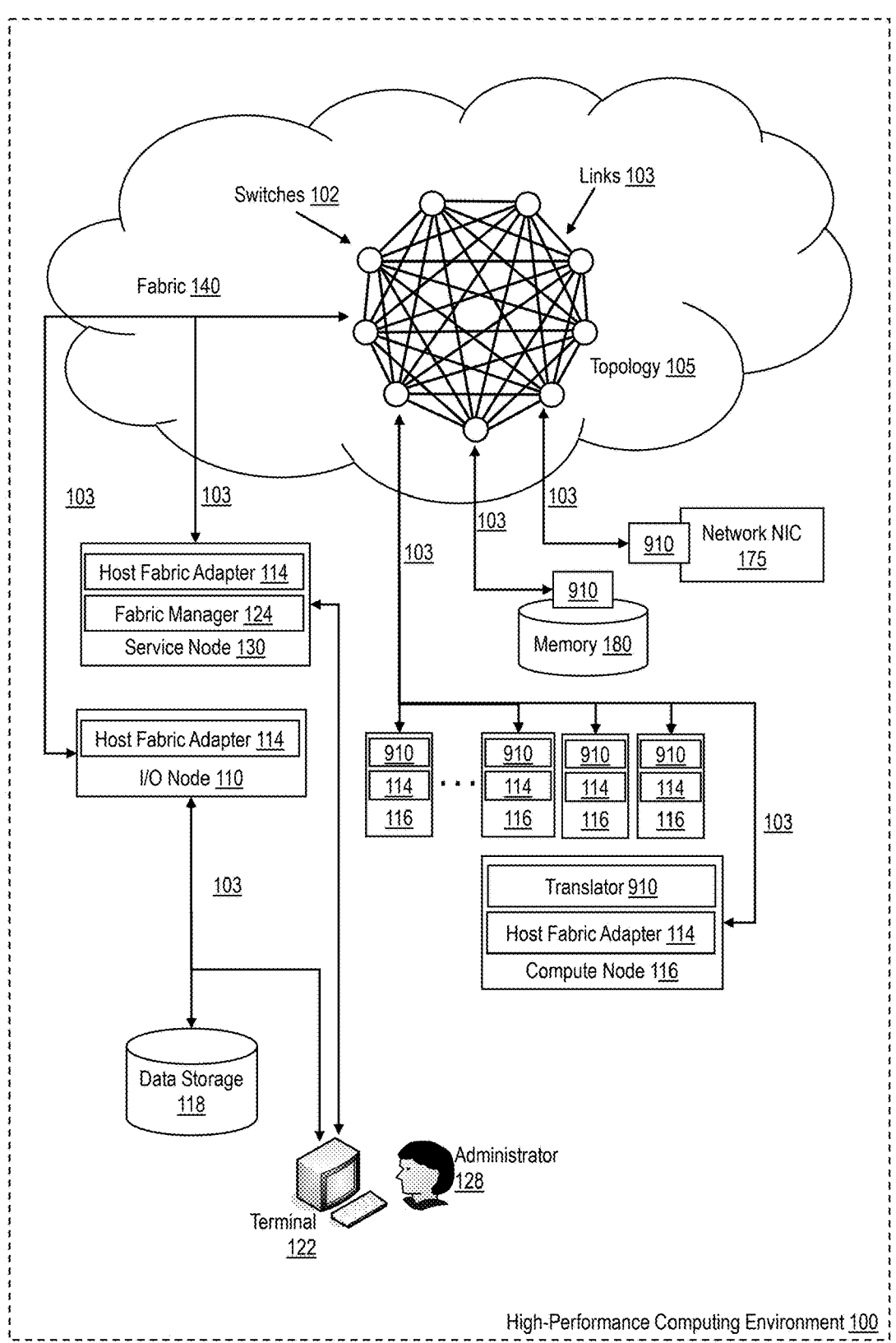
FIG. 1 sets forth a system diagram of an example high-performance computing environment useful for remote execution of local server bus operations according to embodiments of the present invention.

FIG. 1 sets forth a system diagram of an example high-performance computing environment useful for remote execution of local server bus operations according to embodiments of the present invention. The example high-performance computing environment of FIG. 1 includes a fabric (140) which includes one or more switches (102), links (103), and host fabric adapters (114) integrating the fabric with the devices that it supports. The fabric (140) according to the example of FIG. 1 is a unified computing system that includes interconnected nodes and switches that often look like a weave or a fabric when seen collectively. In the example of FIG. 1, the fabric (140) includes host fabric adapters (114), switches (102), and links (103). The compute nodes in the example of FIG. 1 are ae connected to the fabric through a host fabric adapter (114).

The switches (102) of FIG. 1 are multiport modules of automated computing machinery, hardware and firmware, which receive and transmit packets. Typical switches receive packets, inspect packet header information, and transmit the packets according to routing tables configured in the switch. Often switches are implemented as or with one or more application specific integrated circuits ('ASICs'). In many cases, the hardware and firmware of the switch implements packet routing and firmware of the switch configures routing tables, performs management functions, fault recovery, and other complex control tasks as will occur to those of skill in the art. In this disclosure, the phrases "fabric-switched," "fabric-switched transmission" and "fabric-switched packet" refer to packet switching carried out by such hardware and firmware optimized for long channel, low lane count interconnects.

Switches implementing long channel, low lane count interconnects include the Omni-Path Express switches available from Cornelis Networks. Omni-Path Express is a hardware foundation with the OpenFabrics Interfaces (OFI) framework that delivers low-latency, high message rate, and excellent collectives performance, at low CPU utilization.

Omni-Path packets ('OPA packets') are examples of fabric-switched packets according to embodiments of the present invention.

The switches (102) of the fabric (140) of FIG. 1 are connected to other switches with links (103) to form one or more topologies. A topology is a wiring pattern among switches, HFAs, and other components and routing algorithms used by the switches to deliver packets to those components. Switches, HFAs, and their links may be connected in many ways to form many topologies, each designed to optimize performance for their purpose. Examples of topologies useful according to embodiments of the present invention include HyperX topologies, Star topologies, Dragonflies, Megaflies, Trees, Fat Trees, and many others.

Links (103) may be implemented as copper cables, fiber optic cables, and others as will occur to those of skill in the art. In some embodiments, the use of double density cables may also provide increased bandwidth in the fabric. Such double density cables may be implemented with optical cables, passive copper cables, active copper cables and others as will occur to those of skill in the art.

The example of FIG. 1 includes a service node (130). The service node (130) provides services common to pluralities of compute nodes, loading programs into the compute nodes, starting program execution on the compute nodes, retrieving results of program operations on the compute nodes, and so on. The service node communicates with administrators (128) through a service application interconnect that runs on computer terminal (122).

The service node (130) of FIG. 1 has installed upon it a fabric manager (124). The fabric manager (124) of FIG. 1 is a module of automated computing machinery for configuring, monitoring, managing, maintaining, troubleshooting, and otherwise administering elements of the fabric (140). The example fabric manager (124) is coupled for data communications with a fabric manager administration module with a graphical user interface ('GUI') (126) allowing administrators (128) to configure and administer the fabric manager (124) through a terminal (122) and in so doing configure and administer the fabric (140). In some embodiments of the present invention, routing algorithms are controlled by the fabric manager (124) which in some cases configures routes from endpoint to endpoint.

The example of FIG. 1 includes an I/O node (110) responsible for input and output to and from the high-performance computing environment. The I/O node (110) of FIG. 1 is coupled for data communications to data storage (118) and a terminal (122) providing information, resources, GUI interaction and so on to an administrator (128).

The compute nodes (116) of FIG. 1 operate as individual computers including at least one central processing unit ('CPU'), volatile working memory and non-volatile storage. The hardware architectures and specifications for the various compute nodes vary and all such architectures and specifications are well within the scope of the present invention as will occur to those of skill in the art. Such non-volatile storage may store one or more applications or programs for the compute node to execute.

Each compute node (116) in the example of FIG. 1 has installed upon it a host fabric adapter (114) ('HFA'). An HFA is a hardware component that facilitates communication between a computer system and a network or storage fabric. It serves as an intermediary between the computer's internal bus architecture and the external network or storage infrastructure. The primary purpose of a host fabric adapter is to enable a computer to exchange data with other devices, such as servers, storage arrays, or networking equipment, over a specific communication protocol. HFAs deliver high bandwidth and increase cluster scalability and message rate while reducing latency. The HFA of FIG. 1 provides dispersive routing, congestion control and other functions.

The HFA of FIG. 1 also marries the long channel, low lane count domain of the fabric with the short channel, high lane count domain of local compute nodes allowing remote execution of server bus operations according to embodiments of the present invention. The autonomous translator of the present invention allows local bus operations previously confined to local execution to be executed remotely. The example of FIG. 1 includes two resources connected to the HFAs, switches, and links of the fabric. The resources include memory (180) and a network interface (175) such as an Ethernet NIC. Each of these resources are capable of carrying out local bus operations such as PCIe operations if connected directly to a local bus. Because the resources (180 and 175) are remote, conventional local bus operations, such as PCIe and CXL cannot be executed remotely without unacceptable error rates. In the case of FIG. 1, however, the HFAs (114) supporting the compute nodes (116) and the resources (180 and 175) are equipped with an autonomous and integrated translator (910) for remote execution of local server bus operations according to embodiments of the present invention.

The translators (910) integrated with both the HFA (114) and the resources (180, 175) include encapsulation logic and decapsulation logic. The encapsulation logic encapsulates transactions for server bus operations with header and trailer information for fabric-switched transmission through the fabric. The decapsulation logic removes the header and trailer information from received fabric-switched packets. The encapsulated transaction typically includes a fabric header at the front which enables the switch to route it, a CRC at the end to detect corruption, and other information as will occur to those of skill in the art. As such, server bus operations that would otherwise only be executable locally may be executed at the remote resources (180, 175).

Figure 2:
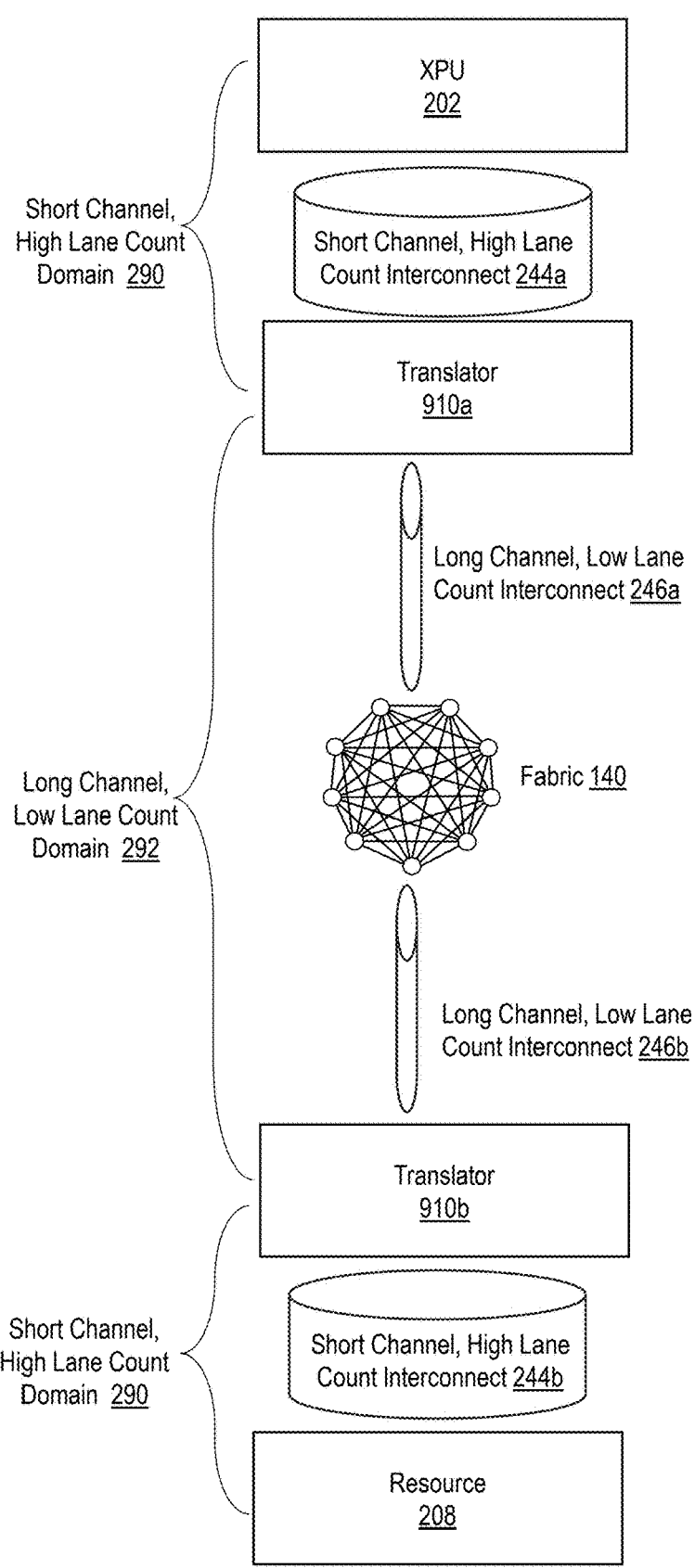
FIG. 2 sets forth a block diagram illustrating an example system for remote execution of local server bus operations according to example embodiments of the present invention.

For further explanation, FIG. 2 sets forth a block diagram illustrating an example system for remote execution of local server bus operations according to example embodiments of the present invention. The example of FIG. 2 is simplified to illustrate the short channel, high lane count domain (290) of compute nodes and the long channel, low lane count (292) domain of the fabric (140). The system of FIG. 2 illustrates an XPU (202) having a short channel, high lane count interconnect (244a) with a translator (910a) supporting the XPU (202). The term XPU is used to mean processors such as CPUs, GPUs, and others as will occur to those of skill in the art. The term short channel, high lane count interconnect is used to mean interconnects such as PCIe, CXL, and others as will occur to those of skill in the art. The translator (910a) of FIG. 2 also has a long channel, low lane count interconnect (246) to the fabric (140).

The system of FIG. 2 also illustrates a resource (208) having a short channel, high lane count interconnect (244b) with a translator (910b). The translator also has a supporting the XPU (202). The translator (910b) of FIG. 2 also has a long channel, low lane count interconnect (246b) to the fabric (140).

Translators according to embodiments of the present invention are typically integrated. In many embodiments, such translators are integrated into a host fabric adapter supporting a compute node or other device. For further explanation, FIG. 3 sets forth a block diagram of a compute node (116) including a host fabric adapter (114) with a translator (910a) according to embodiments of the present invention. The compute node (116) of FIG. 3 includes processing cores (602), random access memory ('RAM') (606) and a host fabric adapter (114). The example compute node (116) is coupled for data communications with a fabric (140) according to the present invention.

Figure 3:
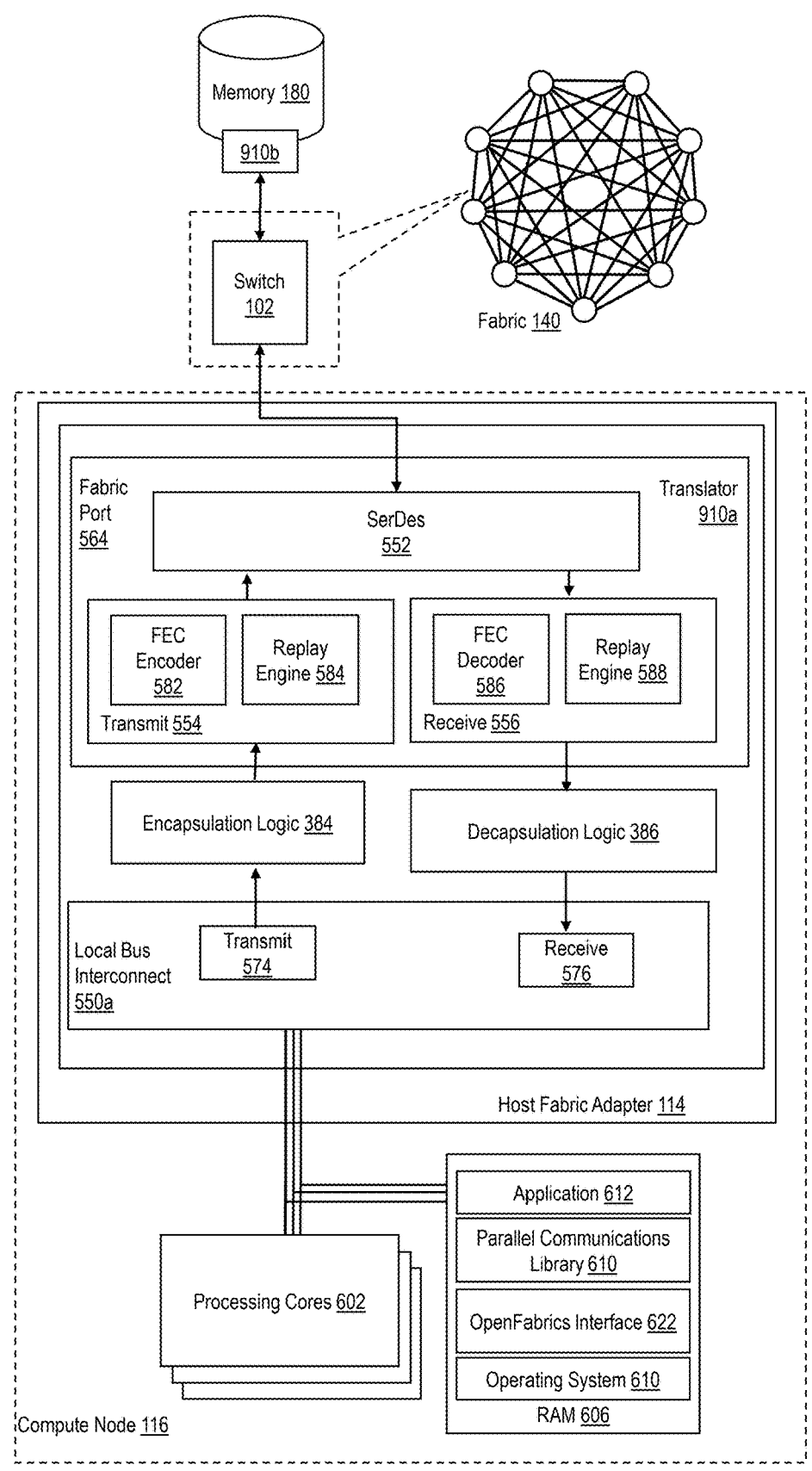
FIG. 3 sets forth a block diagram of a compute node including a host fabric adapter with a translator according to embodiments of the present invention.

Stored in RAM (606) in the example of FIG. 3 is an application (612), a parallel communications library (610), an OpenFabrics Interface module (622), and an operating system (608). Applications for high-performance computing environments, artificial intelligence, and other complex environments are often directed to computationally intense problems of science, engineering, business, and others. A parallel communications library (610) is a library specification for communication between various nodes and clusters of a high-performance computing environment. A common protocol for HPC computing is the Message Passing Interface ('MPI'). MPI provides portability, scalability, and high-performance. MPI may be deployed on many distributed architectures, whether large or small, and each operation is often optimized for the specific hardware on which it runs.

OpenFabrics Interfaces (OFI), developed under the OpenFabrics Alliance, is a collection of libraries and applications used to export fabric services. The goal of OFI is to define interfaces that enable a tight semantic map between applications and underlying fabric services. The OFI module (622) of FIG. 3 packetizes the message stream from the parallel communications library for transmission.

As mentioned above, the compute node of FIG. 3 includes a host fabric adapter (114). The HFA (114) of FIG. 3 includes a local bus interconnect (550a) supporting short channels, high lane count interconnect such as PCIe, CXL, or other such interconnect as will occur to those of skill in the art. The local bus interconnect has a receive controller (576) and a transmit (controller) to administer transactions associated with local server bus operations.

The HFA (114) of FIG. 3 includes a translator (910a). The translator (910a) includes encapsulation logic (384) that encapsulates transactions of local server bus operations with header and trailer information for fabric-switched transmission to a remote autonomous translator (910b) for a remote resource, in this case, memory (180). The translator (910a) includes decapsulation logic (386) that decapsulates packets of the header and trailer information and provides the decapsulated transaction for transmission on the local server bus.

Encapsulation is the process of concatenating fabric-switched packet headers or trailers with the transactions associated with local server bus operations for transmission over networks. Decapsulation is the reverse process for receiving information. It removes header or trailer information. Examples of header and trailer information (562a) for fabric-switched packets includes context ID, source local ID ('SLID'), a destination local ID ('DLID'), and other information for fabric-switched packets according to example embodiments of the present invention.

The translator also includes a fabric port (564) for data communications through the fabric with a remote translator (910b) servicing the remote resource, in this case memory (180). The fabric port (564) provides the interface on the adapter to connect to the fabric and includes a serializer/deserializer (552), a transmit controller (554), and a receive controller (556).

Reliable packet transmission requires infrastructure to inspect packets, identify defective data, and correct the defective data. Such infrastructure is useful in identifying errors to link imperfections, length-dependent signal loss, and other factors. Redundant bits are often added to the data packet by the sender using an error-detecting (ED) code, such as a cyclic redundancy check (CRC). CRC is a hash function that detects accidental changes to raw computer data commonly used in digital telecommunications networks and storage devices such as hard disk drives. CRC uses redundant bits added to the data packet for error detection.

CRC alone is inadequate for CXL switching. The problem is tail latency, the measure of the highest-latency transactions. CRC error detection in conventional systems drive an end-to-end retransmission with unacceptably high latency. In contrast, embodiments of the present invention provide two additional techniques to improve tail latency.

Forward error correction (FEC), or error-correcting code (ECC), is a process of a sender adding redundant data to a packet, such that the data may be recovered (up to the capability of the code being used) by a receiver even when errors were introduced during transmission. Redundancy allows the receiver to detect a limited number of errors that may occur in the packet and to correct these errors. The redundant data or parity data is additional data bits added to the data packet, such that the packet includes payload bits (original data bits) and FEC bits. Example FEC codes for processing data include Hamming codes and Reed-Solomon codes.

Link-level replay is error correction using retransmissions of data and may be referred to simply as replay, as the sequence of packets starting from the erroneous packet are retransmitted from the sender to the receiver. LLR has much lower latency than an end-to-end replay. Conventional systems rely on end-to-end replay, meaning that an error is detected at the destination endpoint which then requests a replay from the transmitter. This adds many switch hops to the recovery path and implies much deeper buffers storing the data to be replayed. LLR minimizes this latency and buffer capacity by recovering for a single link at a time. LLR also offloads the replay function from the endpoints, leaving only LLR over their link to the switch to which they're directly connected. And LLR operates at a lower level of the stack, further offloading the higher layers while further minimizing the latency to recover.

Translators of the present invention allow for error correction in fabric communications. The transmit controller (554) includes a FEC encoder (582) and a replay engine (584). The FEC encoder (582) encodes the data to add the correction bits to the payload bits when transmitting data. The replay engine (584) retransmits data sequentially starting from the identified erroneous data. The receive controller (556) includes a FEC decoder (586) and a replay engine (588). The FEC decoder (586) decodes received data to identify data errors and correct the errors. The replay engine (588) requests that the sender retransmit data sequentially starting from the identified erroneous data. Error correction useful with remote execution of local server bus operations according to embodiments of the present invention is described in U.S. patent application Ser. No. 17/817,352, entitled Burst Error Correction, assigned to Cornelis Networks and incorporated by reference in its entirety.

Figure 4:
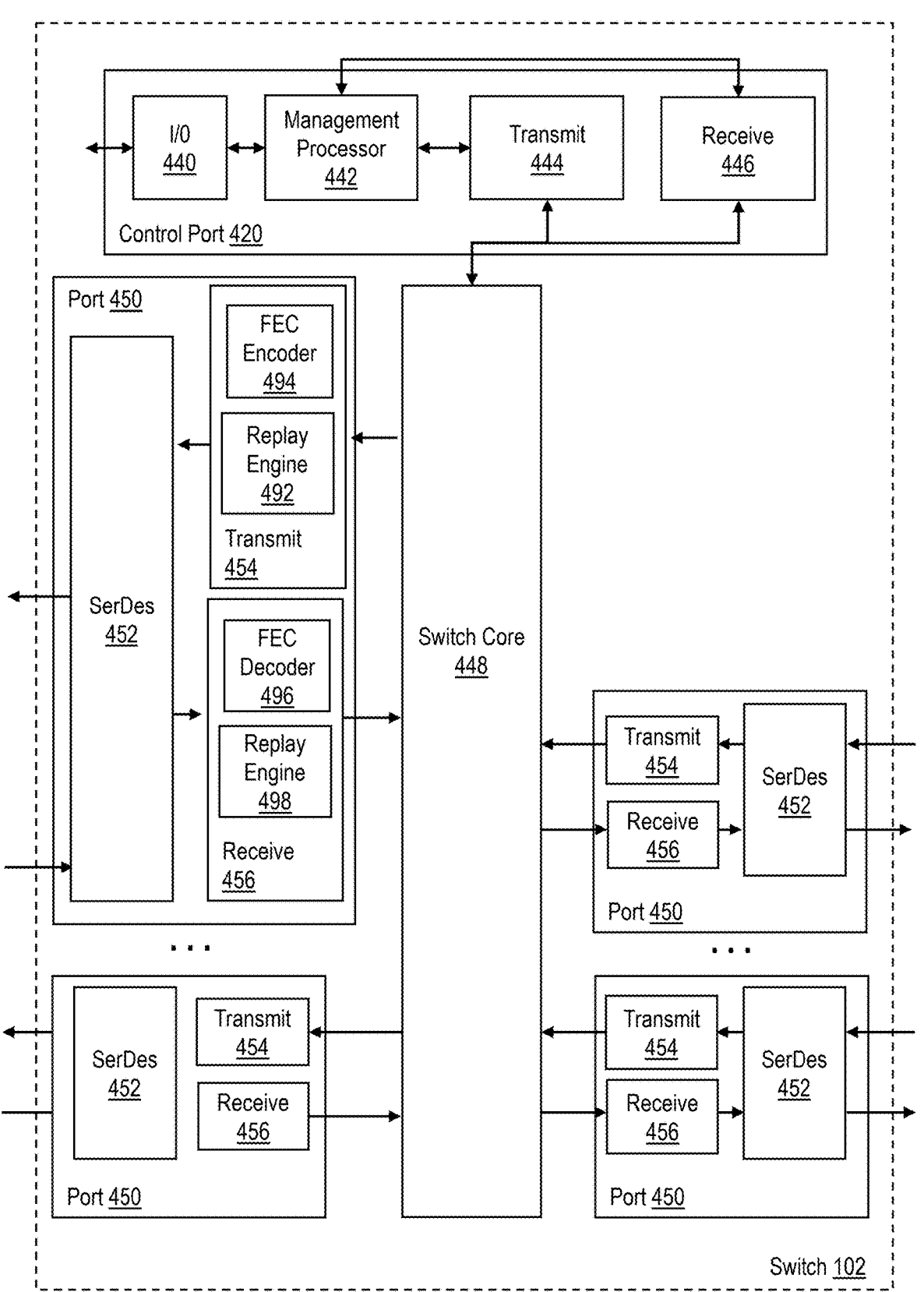
FIG. 4 sets forth a block diagram of an example switch useful in remote execution of local server bus operations according to embodiments of the present invention.

For further explanation, FIG. 4 sets forth a block diagram of an example switch useful in remote execution of local server bus operations according to embodiments of the present invention. Switches such as the one depicted in FIG. 4 are designed for long channels and fabric-switched domains as discussed above. The example switch (102) of FIG. 4 includes a control port (420), a switch core (448), and a number of ports (450). The control port (420) of FIG. 4 includes an input/output ('I/O') module (440), a management processor (442), a transmit controller (444), and a receive controller (446). The management processor (708) of the example switch of FIG. 4 maintains and updates routing tables for the switch. In the example of FIG. 4, each receive controller maintains the latest updated routing tables. The example switch (102) of FIG. 4 includes a number of ports (450).

Each port (450) is coupled with the switch core (448) and a transmit controller (454) and a receive controller (456) and a SerDes (452). The transmit controller (454) includes a FEC encoder (494) and a replay engine (492). The FEC encoder (494) encodes the data to add the correction bits to the payload bits when transmitting data. The replay engine (492) retransmits data sequentially starting from the identified erroneous data. The receive controller (456) includes a FEC decoder (496) and a replay engine (598). The FEC decoder (496) decodes received data to identify data errors and correct the errors. The replay engine (498) requests that the sender retransmit data sequentially starting from the identified erroneous data.

As discussed above, inventive autonomous and integrated translators provide remote execution of local server bus operations. For further explanation, FIG. 5 sets forth a flow chart of an example method of remote execution of local server bus operations according to embodiments of the present invention. The method of FIG. 5 includes receiving (502), on a local bus (550*a*) by an autonomous translator (910*a*) for a local processor (202), a transaction (292) for local bus operations of the local processor (202) for execution by a remote resource (208).

Figure 5:
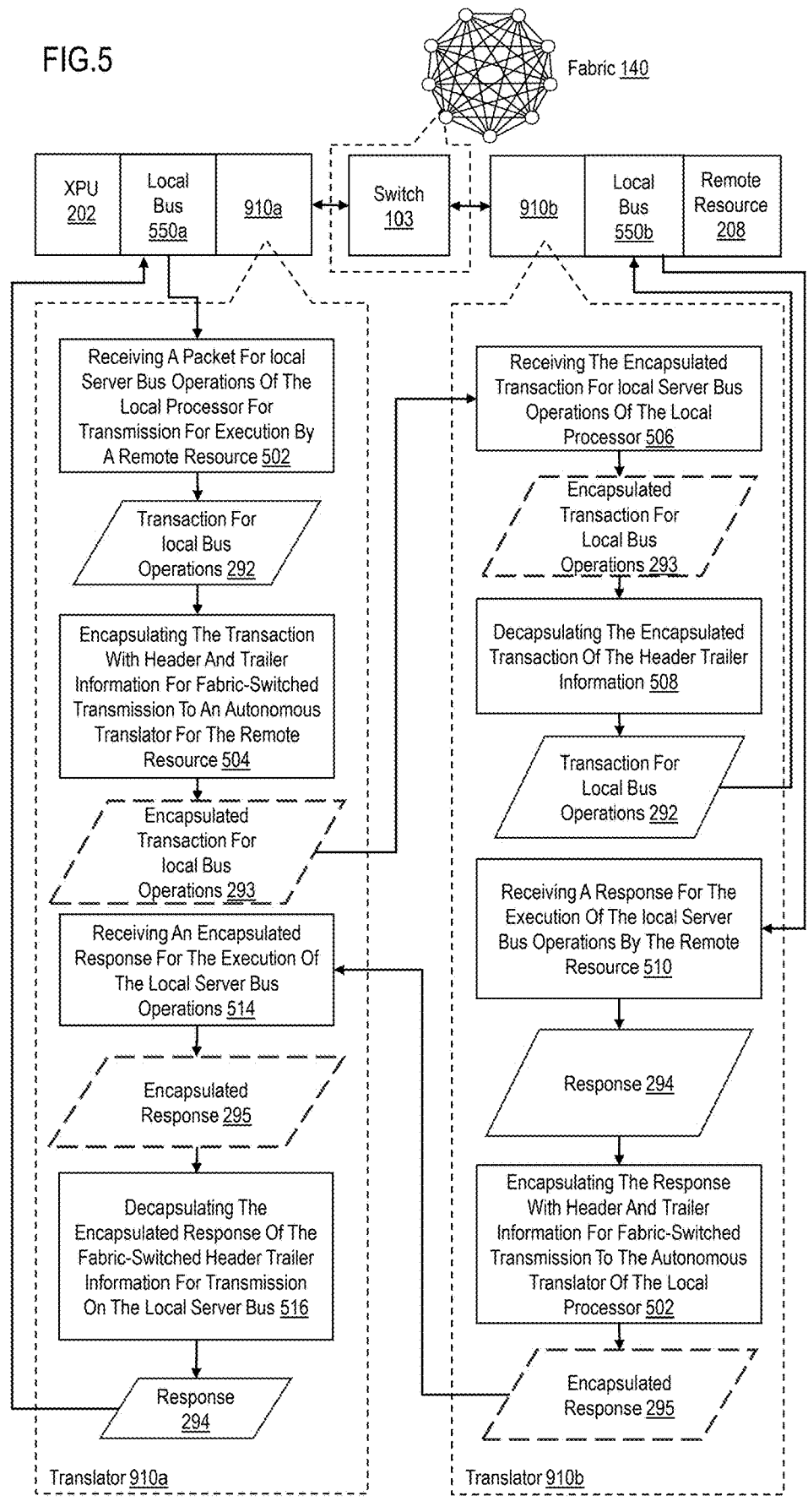
FIG. 5 sets forth a flow chart of an example method of remote execution of local server bus operations according to embodiments of the present invention.

The method of FIG. 5 includes encapsulating (504) the transaction (292) with header and trailer information (562*a*) for fabric-switched transmission to an autonomous translator (910*b*) for the remote resource (208). For clarity of explanation, packets encapsulated with fabric-switched header and trailer information are depicted in dashed lines while transactions for local bus operations prior to or after encapsulation or decapsulation are depicted in solid lines in FIG. 5.

The packet (293) encapsulating the transaction is sent to the translator (910*b*) for the remote resource (208) and the method of FIG. 5 continues by receiving (506), by the translator (910*b*), the packet (293) encapsulating the transaction for local server bus operations of the local processor (202). Receiving (506) the packet (293) may be carried out by receiving the packet through a long channel, low lane count interface from a remote resource through the fabric (140).

The method of FIG. 5 includes decapsulating (508), by the autonomous translator (910*b*) for the remote resource (208), the packet (293) of header trailer information for transaction on the bus (550*b*) of the remote resource (208). Decapsulating (508) the packet (293) of header trailer information provides to the local server bus operation transactions for execution by the remote resource. In response to carrying out the local server bus transaction, the resource provides a response. The method of FIG. 5 continues by receiving (510), on the bus (550*b*) by the autonomous translator (910*b*) for the remote resource (208), a response (294) for the execution of the local server bus transaction of the local processor by the remote resource (208).

The method of FIG. 5 includes encapsulating (512), by the autonomous translator (910*b*) for the remote resource (208), the response (294) with header and trailer information (562*b*) for fabric-switched transmission to the autonomous translator (910*a*) of the local processor (202).

The packet (295) is sent to the translator (910*a*) servicing the XPU and the method of FIG. 5 includes receiving (514), by the autonomous translator (910*a*) for the local processor (202) from an autonomous translator (910*b*) for the remote resource (208), an encapsulated response (294). The method of FIG. 5 includes decapsulating (516), by autonomous translator (910*a*) for a local processor (202), the response packet (294) of the header trailer information for transaction on the local server bus (550*a*). Decapsulating the response packet may include retrieving a context ID for association with a local bus operation. For example, a successful store operation will have an associated response. Such an operation and response may be associated such that remote execution of the server bus operations occurs transparently to the XPU.

Those of skill in the art will recognize that packets switched in the fabric-switched domain are amenable to error correction in that domain. Examples of such error correction include cyclic redundant checks ('CRC'), forward error correction ('FEC'), and Link Level Replay ('LLR) and others. CRC, FEC, and LLR are provided for explanation, and are also discussed in U.S. patent application Ser. No. 17/817,352 incorporated by reference herein in its entirety. CRC In fact, many error correction mechanism may be useful in remote execution of local server bus operations and all such mechanisms are well within the scope of the present invention.

Those of skill in the art will recognize the benefit of high radix for CXL switching. For an example network topology of a fat tree with 1024 endpoints, consider two ASICs with 192 SERDES lanes each. This may be a relatively large SERDES count, consistent with a cost-effective switch. A switch based on native 16-lane PCIe PHY would have 12 ports, known as radix 12. The equivalent switch using the present invention would have radix 48. The resulting tree networks would have 2 tiers for the present invention, or 4 tiers for the native PCIe. The switch count is drastically larger for the PCIe version, and each cable is far more expensive than for the present invention. Therefore, the cost is far higher for native PCIe. PCIe latency is also far higher at 7 switch hops, compared with 3 for the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An autonomous and integrated translator for server bus operations, the translator comprising:
   encapsulation logic; and
   decapsulation logic,
   wherein the encapsulation logic encapsulates transactions for server bus operations with header and trailer information for fabric-switched packets and wherein the decapsulation logic decapsulates the header and trailer information from received fabric-switched packets for bus transactions; and
   a short-channel, high-lane count interconnect for receiving and transmitting unencapsulated transactions for server bus operations and long-channel, low-lane count interconnect for receiving and transmitting encapsulated fabric-switched packets.

2. The translator of claim 1 wherein the transactions for server bus operations are PCIe transactions.

3. The translator of claim 1 wherein the transactions for server bus operations are CXL transactions.

4. The translator of claim 1 wherein the fabric-switched packets are OPA packets.

5. A host fabric adapter, the host fabric adapter comprising:

one or more fabric ports;

a local server bus, and a translator including encapsulation logic and decapsulation logic, wherein the encapsulation logic encapsulates transactions for server bus operations with fabric-switched packet header and trailer information and wherein the decapsulation logic decapsulates the header and trailer information from received fabric-switched packets for local bus transactions; and a short-channel, high-lane count interconnect for receiving and transmitting unencapsulated transactions for server bus operations and long-channel, low-lane count interconnect for receiving and transmitting encapsulated fabric-switched packets.

6. The host fabric adapter of claim 5 wherein the local server bus comprises a PCIe bus.

7. The host fabric adapter of claim 5 wherein the local server bus comprises a CXL bus.

8. The host fabric adapter of claim 5 further comprising error correction logic.

9. The host fabric adapter of claim 5 wherein the error correction logic further comprises forward error correction logic.

10. The host fabric adapter of claim 5 wherein the error correction logic comprises link-level replay logic.

* * * * *